(12) United States Patent
Monpeurt et al.

(10) Patent No.: US 11,747,277 B2
(45) Date of Patent: Sep. 5, 2023

(54) OPTICAL COMPONENT FOR AN INTERFEROMETRIC IMAGING DEVICE

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Marine Beurrier-Bousquet, Grenoble (FR); Mathieu Dupoy, Coublevie (FR); Gabriel Jobert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/645,154

(22) Filed: Dec. 20, 2021

(65) Prior Publication Data
US 2022/0196901 A1 Jun. 23, 2022

(30) Foreign Application Priority Data
Dec. 21, 2020 (FR) .................. 20 13816

(51) Int. Cl.
*G01N 21/45* (2006.01)
*G01J 5/0818* (2022.01)
(Continued)

(52) U.S. Cl.
CPC ............ *G01N 21/45* (2013.01); *G01J 5/0818* (2013.01); *G01N 21/35* (2013.01); *G02B 6/0035* (2013.01); *G01J 2005/0077* (2013.01)

(58) Field of Classification Search
CPC ............ G01J 2005/0077; G01J 5/0818; G01N 21/35; G01N 21/45; G02B 6/0035
See application file for complete search history.

(56) References Cited

U.S. PATENT DOCUMENTS

| 5,442,169 A | 8/1995 | Kunz |
| 6,522,794 B1 * | 2/2003 | Bischel ............. G09F 9/305 |
| | | 385/12 |

(Continued)

FOREIGN PATENT DOCUMENTS

| WO | WO 97/12225 A1 | 4/1997 |
| WO | WO 98/22807 A1 | 5/1998 |

(Continued)

OTHER PUBLICATIONS

French Preliminary Search Report dated Sep. 10, 2021 in French Application 20 13816 filed on Dec. 21, 2020, citing documents AA & AO-AS therein 2 pages (with English Translation of Categories of Cited Documents).

(Continued)

*Primary Examiner* — Violeta A Prieto
(74) *Attorney, Agent, or Firm* — Oblon, McClelland, Maier & Neustadt, L.L.P.

(57) ABSTRACT

An optical component for an interferometric imaging device, which comprises:
  an object arm, including a first planar waveguide and a first diffraction grating formed in the first planar waveguide and capable of extracting light from the object arm;
  a reference arm, comprising a second planar waveguide and a second diffraction grating formed in the second planar waveguide and capable of extracting light from the reference arm;
  wherein the optical component is configured such that, in use with an optically reflective surface extending parallel to the plane of the optical component between the object arm and the reference arm, at least part of the light extracted from the object arm interferes with at least part of the light extracted from the reference arm.

14 Claims, 3 Drawing Sheets

(51) Int. Cl.
    *G01N 21/35*     (2014.01)
    *F21V 8/00*     (2006.01)
    *G01J 5/00*     (2022.01)

(56)     References Cited

U.S. PATENT DOCUMENTS

| | | | |
|---|---|---|---|
| 6,545,759 B1 * | 4/2003 | Hartman | G01N 21/7703 356/477 |
| 9,335,259 B2 * | 5/2016 | Gliere | G01N 29/2425 |
| 10,222,197 B2 * | 3/2019 | Jensen | G01B 9/02027 |
| 11,209,352 B2 * | 12/2021 | Boutami | G01N 21/51 |
| 2022/0196384 A1 * | 6/2022 | Monpeurt | G02B 6/0011 |

FOREIGN PATENT DOCUMENTS

| | | |
|---|---|---|
| WO | WO 01/40744 A2 | 6/2001 |
| WO | WO 2008/110026 A1 | 9/2008 |
| WO | WO 2016/053340 A1 | 4/2016 |
| WO | WO 2018/015517 A1 | 1/2018 |

OTHER PUBLICATIONS

U.S. Appl. No. 17/329,503, filed May 25, 2021, 2021/0377464 A1, Monpeurt, C, et al.
U.S. Appl. No. 17/305,347, filed Jul. 6, 2021, Monpeurt, C, et al.
U.S. Appl. No. 17/644,639, filed Dec. 16, 2021, Monpeurt, C, et al.

* cited by examiner

OPTICAL COMPONENT FOR AN INTERFEROMETRIC IMAGING DEVICE

TECHNICAL FIELD

The invention is concerned with the field of sample imaging, e.g infrared imaging.

State of Prior Art

Infrared imaging techniques, based on measurements of local absorption values in a sample, are known in prior art. In some cases, however, the sample to be analysed comprises both highly absorbing compounds and weakly absorbing compounds over a same wavelength range. Absorption by highly absorbing compounds then covers absorption by more weakly absorbing compounds. This situation arises, for example, when the sample contains a large amount of water molecules and a small amount of third party molecules, whose absorption is negligible relative to the absorption by the water molecules. In such a situation, an image directly based on absorption measurements is not adapted.

To avoid this drawback, an image can be formed, not directly on the basis of absorption measurements, but rather on the basis of phase measurements (interferometric imaging). The image made is then a distribution of local values of a phase shift brought by the sample. Imaging based on phase measurements can be implemented using a Mach-Zehnder interferometer, in which one of the arms passes through a sample to be analysed, and using an array-type sensor. However, this solution is limited to transmission measurements, implying strong limitations on the sample, especially in terms of thickness. Furthermore, the different elements making up the interferometer are likely to move relative to each other, which leads to a less than robust device.

Thus there is a need to provide a solution for performing interferometric imaging, using a device that is robust and does not require the sample to have a reduced thickness.

It is especially a purpose of this document to provide an optical component for an interferometric imaging device, wherein said device is robust and does not require the sample to have a reduced thickness.

DISCLOSURE OF THE INVENTION

This objective is achieved with an optical component for an interferometric imaging device, which comprises:
- an object arm, comprising a first planar waveguide extending parallel to a plane called the plane of the optical component, and a first diffraction grating formed in the first planar waveguide and capable of extracting light from said first planar waveguide and from the object arm;
- a reference arm, comprising a second planar waveguide extending parallel to the plane of the optical component, and a second diffraction grating formed in the second planar waveguide and capable of extracting light from said second planar waveguide and from the reference arm.

The optical component is configured such that, in use with an optically reflective surface extending parallel to the plane of the optical component between the object arm and the reference arm, at least part of the light extracted from the object arm interferes with at least part of the light extracted from the reference arm.

The optical component is to be part of an imaging device, utilising local phase shifts brought by the sample to be analysed.

Preferably, but not restrictively, the optical component is to be part of an infrared imaging device. Stated differently, the first and second planar waveguides are each capable of guiding infrared light, and the first and second diffraction gratings are each capable of extracting infrared light from the corresponding planar waveguide. The infrared light may include the central wavelength of at least one absorption peak of a chemical or biological component, whose presence in a sample to be analysed is searched for. Advantageously, the optical component is configured to process light at wavelengths used in infrared spectroscopy, that is light belonging to the infrared spectrum, especially mid-infrared. Alternatively, the optical component is to be part of a visible spectrum imaging device. However, the optical component is not limited to any particular wavelength range. Throughout the text, the term "infrared" concerns a part of the light spectrum belonging to a spectral band ranging from 0.78 μm to 50 μm, more preferably from 2 μm to 14 μm (mid-infrared). Throughout the text, the term "visible" concerns a part of the light spectrum belonging to a spectral band from 0.35 μm to 0.78 μm excluded.

An absorption peak induces a step index, and thus a step phase. One idea underlying this document is therefore to make an image of a sample, not on the basis of absorption measurements, but on the basis of phase measurements.

The optical component comprises an object arm and a reference arm. In use with an optically reflective surface as mentioned above, at least part of the light extracted from the object arm interferes with at least part of the light extracted from the reference arm. By replacing at least a part of said optically reflective surface with a surface of a sample to be analysed, a light beam having interacted with the sample to be analysed and a light beam not having interacted with the sample to be analysed can be interfered with each other. The optical component thus forms an interferometric imaging device, to provide an interference pattern formed by a light beam having interacted with the sample to be analysed and a light beam not having interacted with the sample to be analysed. From this interference pattern, a distribution of phase shift values brought by the sample to be analysed, that is an interferometric image of the sample to be analysed, can be retrieved. It is thus provided an interferometric imaging solution for making a phase image of a sample. Since the image is formed by phase measurements, it is not inconvenient that a same sample contains both highly absorbing compounds such as water, and weakly absorbing compounds over the same wavelength range. This image can be used to determine a distribution of local chemical or biological compositions on the sample to be analysed, by utilising the fact that each chemical or biological compound absorbs (and phase-shifts) some frequencies of an incident radiation, with a specific signature allowing identification (identification by spectroscopy, especially infrared spectroscopy). It is thus possible to determine the chemical or biological composition of a sample, even in the presence of highly absorbing compounds likely to cover the signature of other compounds that are more weakly absorbent in the same wavelength range.

The optical component is for use in which light impinging on the sample to be analysed is returned from the same. Therefore, the optical component does not require the sample to be analysed to have a reduced thickness. For example, the sample may have a thickness up to 100 μm. Light returned from the sample to be analysed may be returned by specular reflection on said sample, or by diffuse reflection (backscattering) on said sample. Alternatively, the sample to be analysed is placed on a reflecting slide, and the light is returned by specular reflection on said reflecting slide after passing through the sample to be analysed. In this case, light thus passes through the sample to be analysed twice.

The optical component is based on planar waveguides each provided with diffraction gratings for light extraction. It can therefore be of large robustness. In particular, it can thus form an optical component integrated onto a substrate, especially an optical component integrated onto a silicon substrate.

The optical component makes it possible to acquire interference patterns related to an entire surface of a sample to be analysed. It therefore forms a wide-field interferometric imaging device. It allows phase measurements to be made, simultaneously related to an entire surface of a sample to be analysed, without the need to move the optical component relative to said sample.

The optically reflective surface mentioned above preferably extends in a plane passing through an end face of the optical component, forming a support surface. In use, the sample is pressed against this support surface, thereby allowing a significant control of a distance between the sample to be analysed and the optical component, and possibly a significant control of a distance between the sample to be analysed and an array detector arranged integral with the optical component.

The first planar waveguide and the second planar waveguide are not superimposed above each other along an axis orthogonal to the plane of the optical component. Preferably, the first planar waveguide and the second planar waveguide are formed to be coplanar.

The optical component has some commonality with the object described in patent application WO 2018/015517. However, this object rather aims at obtaining a holographic image of a sample, and not an image of phase shifts locally brought by absorption in the sample. This object therefore uses illumination in wavelengths not absorbed by the sample, preferably in the visible range. Further, this object is structurally quite different from the optical component. In particular, it comprises only one waveguide.

According to one advantageous embodiment:
the object arm is configured so that at least part of the light extracted by the first diffraction grating emerges from the object arm oriented along a first output axis; and
the reference arm is configured such that at least part of the light extracted by the second diffraction grating emerges from the reference arm oriented along a second output axis;
wherein the second output axis is tilted by an angle less than or equal to 5°, relative to the symmetric of the first output axis according to a planar symmetry by a plane of symmetry orthogonal to the plane of the optical component.

According to one advantageous embodiment:
the object arm further comprises a first support substrate, superimposed on the first planar waveguide along an axis orthogonal to the plane of the optical component; and
the reference arm further comprises a second support substrate, superimposed on the second planar waveguide along an axis orthogonal to the plane of the optical component;
and:
the object arm is configured so that at least part of the light extracted by the first diffraction grating emerges from the object arm at a first output face, belonging to the first support substrate and oriented transversely relative to the plane of the optical component; and
the reference arm is configured so that at least part of the light extracted by the second diffraction grating emerges from the reference arm at a second output face, belonging to the second support substrate and oriented transversely relative to the plane of the optical component.

Advantageously:
in the object arm, the first diffraction grating has a first value of the pattern distribution pitch, adapted to extract a light beam at an extraction wavelength, and along a first direction of extraction such that light penetrates the first support substrate and then emerges from the same at the first output face;
in the reference arm, the second diffraction grating has a second value of the pattern distribution pitch, adapted to extract a light beam at said extraction wavelength, and along a second direction of extraction such that light penetrates the second support substrate and then emerges from the same at the second output face.

Advantageously:
in the object arm, the first direction of extraction is adapted so that an associated light beam impinges at normal incidence on the first output face; and
in the reference arm, the second direction of extraction is adapted so that an associated light beam impinges at normal incidence on the second output face.

Advantageously, each of the first diffraction grating and second diffraction grating:
consists of patterns that each comprise a low index portion, of a low index material, and a high index portion, of a high index material, with the refractive index of the high index material strictly greater than the refractive index of the low index material; and
has a local value of the fill factor which varies monotonically as the first, respectively second, output face are approached, the local value of the fill factor thus gradually approaching the value 0.5, and with the fill factor referring to a ratio of a surface area occupied by the low index portion in a pattern of said diffraction grating to a total surface area occupied by said pattern, said surface areas being defined in a sectional plane parallel to the plane of the optical component.

The optical component may further comprise a splitter with one input and two outputs, configured to receive as an input an initial light beam and to distribute the same towards the object arm and the reference arm, and the optical component may further include:
a first adaptation guide, extending between the first output of the splitter and the first planar waveguide of the object arm, and having an increasing width from an end adjoining the first output of the splitter to an end adjoining the first planar waveguide; and
a second adaptation guide, extending between the second output of the splitter and the second planar waveguide of the reference arm, and having an increasing width from an end adjoining the second output of the splitter to an end adjoining the second planar waveguide.

Preferably, the first adaptation guide and second adaptation guide are each bent, so that a light axis of propagation at the input of the first planar waveguide and a light axis of propagation at the input of the second planar waveguide are parallel to each other and with opposite senses.

The optical component may have planar symmetry, relative to a plane of symmetry orthogonal to the plane of the optical component and passing between the object arm and the reference arm.

Alternatively:
the object arm is configured so that at least part of the light extracted by the first diffraction grating emerges from the object arm oriented along a first output axis;
the reference arm is configured so that at least part of the light extracted by the second diffraction grating emerges from the reference arm oriented along a second output axis; and
the object arm and the reference arm are substantially symmetrical to each other, according to a planar symmetry by a plane of symmetry orthogonal to the plane of the optical component, and with an asymmetry defined by an angular deviation of between 0.5° and 5° between the second output axis and the symmetric of the first output axis by said planar symmetry.

Advantageously:
the object arm further comprises a first lower substrate, with the first planar waveguide interposed between the first support substrate and the first lower substrate;
the reference arm further comprises a second lower substrate, with the second planar waveguide interposed between the second support substrate and the second lower substrate;
wherein the object arm is configured such that light extracted by the first diffraction grating emerges from the object arm through the first support substrate and through the first lower substrate; and
wherein the reference arm is configured so that light extracted by the second diffraction grating emerges from the reference arm through the second support substrate and through the second lower substrate.

It is also proposed an optical system which includes an optical component, and an array detector located between the object arm and the reference arm and configured to acquire an interference pattern formed by at least part of the light extracted from the object arm and at least part of the light extracted from the reference arm.

Preferably, the array detector extends into an intersection region between a light beam extracted from the object arm and reflected on a first zone of the optically reflective surface, and a light beam extracted from the reference arm and reflected on a second zone of the optically reflective surface.

Alternatively:
the object arm is configured to extract light along two distinct directions;
the reference arm is configured to extract light along two distinct directions; and
the array detector extends into a first intersection region and into a second intersection region;
wherein the first intersection region is a region in which a light beam extracted from the object arm and reflected on a first zone on the optically reflective surface, interferes with a light beam extracted from the reference arm and directly impinging on said first intersection region; and
wherein the second intersection region is a region in which a light beam extracted from the reference arm and reflected on a second zone on the optically reflective surface interferes with a light beam extracted from the object arm and directly impinging on said second intersection region.

BRIEF DESCRIPTION OF THE FIGURES

The present invention will be better understood upon reading the description of exemplary embodiments given by way of indication and in no way limiting purposes, with reference to the appended drawings in which.

DESCRIPTION OF THE EMBODIMENTS

For ease of reading, axes in the figures are shown in an orthonormal reference frame (Oxyz). The axis (Oz) refers to a vertical axis. The axes (Ox) and (Oy) together define a horizontal plane.

In the following description, where reference is made to absolute positional qualifiers, such as "high", "low", "left", "right", etc., or relative positional qualifiers, such as "top", "bottom", "upper", "lower", etc., or orientation qualifiers, such as "horizontal", "vertical", etc., reference is made unless otherwise specified to positions or orientations in cross-section views in a plane (Oyz).

Throughout the text, a planar waveguide refers to an optical guiding element, capable of guiding light propagation by successive reflections on planar faces parallel to each other (here, this is more particularly refractive guiding). In a planar waveguide, light is confined along one of the axes of the three-dimensional space, and free to propagate along the other two axes. A waveguide consists of a core, in which light circulates, and a sheath, providing a desired optical index difference between the core and a medium surrounding the core. In the case of a planar waveguide, a core layer is interposed between two sheath layers, and light is guided into the core layer by successive reflections at the interfaces between the core layer and each of the respective sheath layers.

Figure 1A:
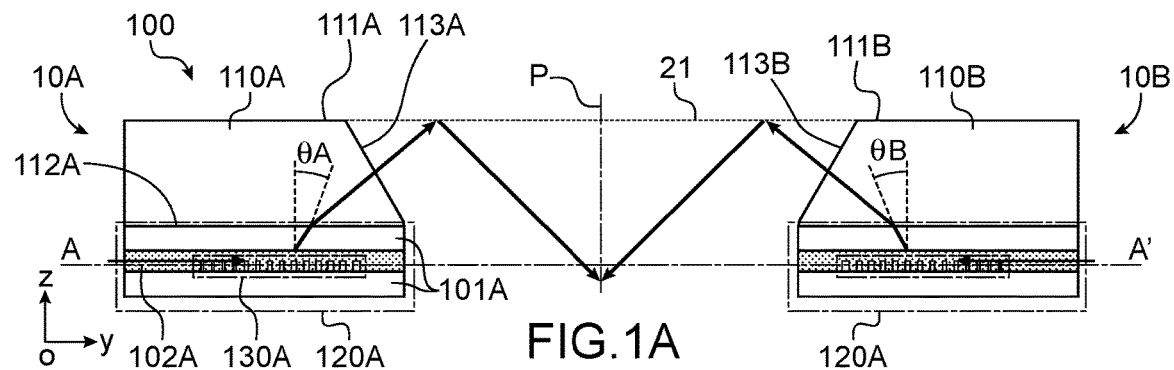
FIGS. 1A and 1B schematically illustrate, in two respective cross-section views, a first embodiment of an optical component.
Figure 1B:
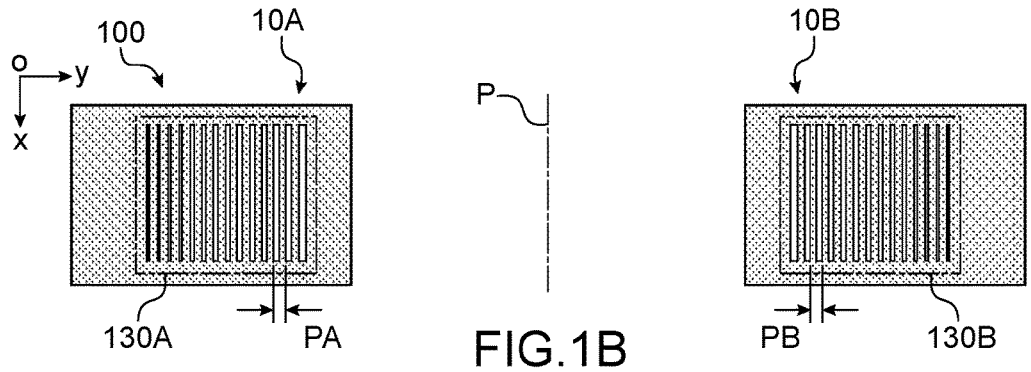

First, with reference to FIGS. 1A and 1B, a first embodiment of an optical component 100 is described. FIG. 1A illustrates the optical component 100, in a cross-section view along a plane parallel to the plane (Oyz). FIG. 1B illustrates the optical component 100 in a cross-section view along a plane AA' parallel to the plane (Oxy).

The optical component 100 comprises an object arm 10A and a reference arm 10B.

Here, the object arm 10A comprises a first support substrate 110A and a first planar waveguide 120A.

The first support substrate 110A here comprises silicon. It is delimited especially by two planar faces 111A, 112A which extend parallel to the plane (Oxy), as well as by a transverse face 113A, called the first output face, obliquely oriented relative to the plane (Oxy) and connecting the two plane faces 111A and 112A.

The first planar waveguide 120A consists of a core layer interposed between two sheath layers. It is formed in a stack consisting of a high index layer 102A interposed between two low index layers 101A. The core layer of the first planar waveguide 120A consists of the high index layer 102A. The sheath layers of the first planar waveguide 120A are each formed in a respective one of the low index layers 101A. Thus, each sheath layer consists of all or part of a respective one of the low index layers 101A.

Here, the low index layers are made of a germanium-silicon alloy (preferably with 40% germanium) and the high index layer is made of germanium. Alternatively, the high index layer and the low index layers are all silicon-germanium alloy, with a higher germanium content in the high index layer. Here, the high-index and low-index layers each have a homogeneous chemical composition, with a refractive index of the high-index layer strictly greater than a refractive index of the low-index layers (here at infrared wavelengths, for example 8 µm). Alternatively, the high-index layer and/or the low-index layers may have an inhomogeneous distribution in its chemical composition and refractive index. For example, it may have a refractive index profile with a gradient. In any case, an average value of the refractive index in the low index layers is strictly lower than an average value of the refractive index in the high index layer.

The high-index and low-index layers each extend in planes parallel to the plane (Oxy), and are superimposed above each other along the axis (Oz). A plane parallel to the plane (Oxy) is called the "plane of the optical component".

The first support substrate 110A and the stack of layers comprising the first planar waveguide 120A are superimposed together along the axis (Oz). The first support substrate 110A extends over the top of the stack, by covering the first planar waveguide 120A. Here, the first support substrate 110A is in direct physical contact with the one low index layer 101A of the stack of layers, with no interlayer in between.

The first planar waveguide 120A comprises at least one first diffraction grating 130A, here a single diffraction grating. The first diffraction grating 130A is configured to extract, from the plane of the first planar waveguide, light circulating in said first planar waveguide 120A.

Here, the first diffraction grating 130A is formed in the core layer of the first planar waveguide 120A on the side opposite to the first support substrate 110A. The invention is however not limited to this arrangement, as the first diffraction grating may also extend into the core layer, on the side of the first support substrate, or into the lower or upper sheath layer of the first planar waveguide 120A. The depth of the first diffraction grating 130A is advantageously lower than or equal to half the thickness of the layer in which it is formed, for example equal to one quarter of that thickness.

The first diffraction grating 130A consists of high index portions and low index portions, with the high index portions consisting of the material of the high index layer 102A, and with the low index portions consisting of the material of the low index layers 101A.

The first diffraction grating 130A extends in a plane (Oxy). The first diffraction grating 130A is here a one-dimensional grating, here with invariant patterns along the axis (Ox). FIG. 1B illustrates the optical component 100, in a cross-section view in a plane AA' parallel to the plane (Oxy), passing through the first diffraction grating 130A. It shows bar-shaped patterns parallel to the axis (Ox). As illustrated in FIG. 1B, the first planar waveguide 102A and the first diffraction grating 130A are of course limited in the direction of the axis (Ox). Preferably, the extent of the first diffraction grating 130A along the axis (Ox) is substantially equal to the dimension along the same axis of the sample to be analysed (see later). Furthermore, the extent of the first planar waveguide 102A along the axis (Ox) is substantially equal to the dimension along the same axis of the first diffraction grating 130A.

The first diffraction grating 130A has a first pattern distribution pitch, PA, which is preferably constant over the whole extent of said grating. (If this pitch were not constant over the whole extent of said grating, then the average value of the pattern distribution pitch over the extent of the grating would be considered). The value of the pitch PA is adapted to extract light from the first planar waveguide 120A, at a first wavelength called first extraction wavelength, and in two first directions of extraction (at diffraction orders +1 and −1). The first two directions of extraction are symmetrical to each other, according to a planar symmetry relative to a plane (Oxy) passing through the first diffraction grating 130A. For simplicity, the first diffraction grating 130A may be considered to be associated with a first extraction wavelength and a first direction of extraction. The first direction of extraction is defined by an extraction angle θA, which is defined relative to the normal to the plane (Oxy) of the optical component 100.

Similarly, the reference arm 10B here comprises a second support substrate 110B and a second planar waveguide 120B. A second diffraction grating 130B is formed in the second planar waveguide 120B. The second support substrate 110B has a transverse face 113B, called the second output face, located facing the first output face 113A.

The reference arm 10B is substantially symmetrical to the object arm 10A, according to a planar symmetry relative to a plane P parallel to the plane (Oxz) and passing between the object arm 10A and the reference arm 10B. Here, the reference arm 10B and the object arm 10A are exactly symmetrical to each other.

The second support substrate 110B consists of the same material as the first support substrate 110A, and has the same thickness along the axis (Oz).

Similarly, the first and second planar waveguides 120A, 120B are formed in similar stacks of low index and high index layers. Thus, the first and second planar waveguides are formed with respective core layers of a same high index material, and respective sheath layers of a same low index material. Therefore, the first diffraction grating 130A and the second diffraction grating 130B each consist of high index portions of a same high index material and low index portions of a same low index material. (The different materials mentioned herein are advantageously, but not necessarily, of spatially homogeneous chemical composition).

The first and second support substrates 110A, 110B are arranged to be coplanar, with their respective coplanar upper faces and their respective coplanar lower faces all parallel to a plane (Oxy). Similarly, the first and second planar waveguides 120A, 120B are arranged to be coplanar, with each having a core layer parallel to a plane (Oxy). Similarly also, the first and second diffraction gratings 130A, 130B are also formed to be coplanar.

The first and second diffraction gratings 130A, 130B are substantially symmetrical to each other, here exactly symmetrical to each other relative to the plane P. The pattern distribution pitch PB in the second diffraction grating 130B is substantially equal to the pattern distribution pitch PA in the first diffraction grating 130A. The second diffraction grating 130B is thus associated with a second extraction wavelength equal to the first extraction wavelength, and with a second direction of extraction substantially equal to the first direction of extraction. The second direction is defined by an extraction angle θB, which is defined relative to the normal to the plane (Oxy) of the optical component 100. Here, the pitches PA and PB are equal, so that the angles θA and θB are equal in absolute value, and with opposite signs. The first and second directions of extraction are therefore symmetrical to each other relative to the plane P.

The object arm 10A and the reference arm 10B are each optimised for a narrow spectral range, for example with an extent lower than 0.5 μm.

In the optical component 100, a series of stages superimposed along the axis (Oz) can be defined, and including:
- a lower low-index stage, including the respective lower sheaths of the first and second planar waveguides 120A, 120B, both made of low-index material;
- a high index stage, comprising the respective core layers of the first and second planar waveguides 120A, 120B, both made of high index material with a refractive index strictly greater than that of the low index material;
- an upper low-index stage, including the respective upper sheaths of the first and second planar waveguides 120A, 120B, both made of low-index material; and
herein, a support stage, including the first and second support substrates 110A, 110B.

In FIG. 1A, a surface 21, parallel to the plane (Oxy), and located on the same side as the support substrates 110A, 110B relative to the planar waveguides 120A, 120B, has been shown in dotted lines. Here, the surface 21 extends in a same plane as the respective upper faces 111A, 111B of the support substrates 110A, 110B, on the side opposite to the planar waveguides 120A, 120B.

The surface 21 is assumed to be optically reflective, on the side of the optical component, at the extraction wavelengths of the first and second diffraction gratings 130A, 130B. The optical component 100 is configured so that at least part of the light extracted by the first diffraction grating 130A, and specularly reflected on the surface 21, interferes with at least part of the light extracted by the second diffraction grating 130B and reflected on the surface 21.

Figure 2:
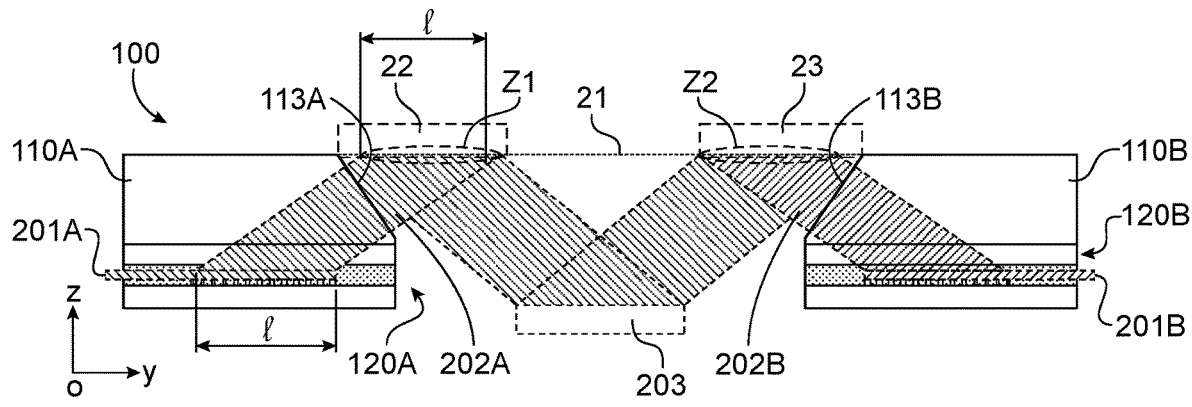
FIG. 2 schematically illustrates the optical component of FIGS. 1A and 1B, in use.

FIG. 2 schematically illustrates the optical component 100 of FIGS. 1A and 1B, in use. In FIG. 2, a sample to be analysed 22 and a reference sample 23 are shown in dotted lines. For simplicity, refraction between a planar waveguide and the corresponding support substrate is ignored in this figure.

In the following, the surface 21 is simply used to define positioning of the sample to be analysed 22 and the reference sample 23. It does not correspond to an actual element of the optical component 100.

The sample to be analysed 22 is a chemical or biological sample. It comprises a lower face, located on the side of the optical component 100, and extending at a first zone Z1 of the surface 21. The first zone Z1 is, for example, a square or a rectangle, with sides between 1 mm and 10 mm.

The reference sample 23 consists of a known material. It has a lower face which extends parallel to the plane (Oxy), over a second zone Z2 of the surface 21. The dimensions of the second zone Z2 are similar to those of the first zone Z1.

In use, a light beam 201A at the first extraction wavelength is injected as an input into the first planar waveguide 120A and then extracted by the first diffraction grating. Light is extracted from the first planar waveguide 120A in two symmetrical directions. Here, only light extracted towards the first support substrate 110A is considered. This light passes through the first support substrate 110A, from where it emerges at the first output face 113A, in the form of a light beam called object beam 202A. The object beam 202A propagates to the sample to be analysed 22, at which it is reflected, here by specular reflection, after undergoing local phase shifts related to the local indices in the sample to be analysed 22. After reflection, the object beam 202A propagates to a zone 203 for receiving an array detector.

Similarly, a light beam 201B at the second extraction wavelength (equal to the first extraction wavelength) is injected as an input into the second planar waveguide 120B, and then extracted by the second diffraction grating. The first and second extraction wavelengths being equal, the light beam 201B has the same central wavelength as the light beam 201A. Advantageous embodiments incorporating a splitter, and for injecting the beams of light 201A and 201B simultaneously into the first and second planar waveguides 120A, 120B, are detailed in the following. Light is extracted from the second planar waveguide 120B in two symmetrical directions. Here, only light extracted towards the second support substrate 110B is considered. This light passes through the second support substrate 110B, from where it emerges at the second output face 113B, in the form of a light beam called reference beam 202B. The object beam 202A and the reference beam 202B are substantially symmetrical to each other relative to the plane P (see FIG. 1A), here exactly symmetrical. The reference beam 202B propagates to the reference sample 23, at which it is reflected, here by specular reflection, after undergoing local phase shifts related to local indices in the reference sample 23. After reflection, the reference beam 202B propagates to the zone 203.

At zone 203, the object beam 202A and the reference beam 202B cover and interfere with each other. The interference pattern may be acquired by an array detector positioned in zone 203, sensitive to the wavelength of the object beam 202A and the reference beam 202B. This interference pattern makes it possible to obtain a distribution map of phase shifts of the sample to be analysed 22. This in turn makes it possible to obtain a distribution map of local refractive index values, and then a distribution map of chemical or biological compositions.

In the example of use described here, light is reflected by specular reflection on the sample to be analysed and the reference sample. Alternatively, light may be reflected by diffuse reflection instead. According to another embodiment, the sample to be analysed, and possibly the reference sample, has a reduced thickness and extends on a respective support slide, optically reflective at the wavelength of the object and reference beams. Light passes through the sample a first time, is reflected on the support slide, then passes through the sample a second time and emerges from the sample before forming interference. The support slide extends on the side of the sample opposite to the optical component, and corresponds to the location of the optically reflective surface 21. This alternative, based on light reflection and involving two occurrences of light passing through the sample, is called "transflection".

To avoid destructive interference due to internal reflections of the extracted light in the direction opposite to the support substrates 110A, 110B, the optical component 100 may comprise respective absorption layers or respective scattering surfaces on the side of the planar waveguides opposite to the support substrates. Additionally or alternatively, the thickness of the low index layers, under the planar waveguides, is adapted to achieve constructive interference between light extracted towards the support substrates and light extracted in the opposite direction.

The first and second support substrates 110A, 110B are each transparent to the extraction wavelength of the first and second diffraction gratings. They preferably have optical losses lower than 3 dB/cm at said extraction wavelength. Support substrates 110A, 110B made of silicon meet this condition in the infrared range in particular. However, the invention is not limited to this material. When the optical component is adapted for use with visible light, the first and second support substrates 110A, 110B then consist of a material which is optically transparent in the visible range, for example diamond or a glass ($SiO_2$, BF33, quartz, etc.) or an optical polymer, etc.

Preferably, the first and second planar waveguides 120A, 120B are each single mode along the axis (Oz), and at their extraction wavelength.

As illustrated in FIG. 2, the object beam 202A spreads, over the surface 21, along a surface area whose extent along the axis (Oy) is here equal to the length l of the first diffraction grating along the same axis. Typical values for the length l are between 1000 µm and 2000 µm, for example 1500 µm. There is a relationship between thickness of the first support substrate 110A and length l, ensuring that all the light extracted to the first support substrate 110A does impinge on the first output face 113A thereof. The same applies in the reference arm, with the reference beam 202B, the length of the second diffraction grating, and the thickness of the second support substrate. The respective lengths of the first and second diffraction gratings are preferably identical.

In a particular exemplary embodiment, the extraction wavelength of the first and second diffraction gratings is 7.25 µm. The sheath layers are made of 40% germanium SiGe alloy and the core layers are made of germanium. The core layers are each 2 µm thick (to make the guides single mode at 7.25 µm). The lit zone on the sample is a square with 1.36 mm side. The thickness of the support substrates is 641 µm, which is the minimum thickness that allows all the light extracted to the support substrates to impinge on the respective output faces of the support substrates. The array detector is located 450 µm from the object and reference arms. The pitch of the diffraction gratings is 6.51 µm, which allows light to impinge on normal incidence on the output faces tilted by 54.74°. The depth of the gratings here is 0.5 µm. The array detector is a square of 40*40 pixels, distributed over a square with 1.36 mm side.

In each diffraction grating 130A, 130B, light extraction is made gradually as light propagates through the same (in order to have homogeneous lighting on the surface to be lit). Here, light propagates in the diffraction grating 130A, respectively 130B, along the axis (Oy), and light is extracted by said grating as it propagates. At each point in the grating 130A, respectively 130B, along the axis (Oy), the amount of light extracted is equal to the product of a local value of the extraction rate multiplied by the amount of light remaining, in the corresponding planar waveguide, at the location considered along the axis (Oy). Thus, since the amount of light remaining in the planar waveguide decreases as the light propagates along the axis (Oy), a constant value of the extraction rate in the diffraction gratings would lead to an inhomogeneous extraction of light along the axis (Oy). Thus, advantageously, each of the diffraction gratings 130A, respectively 130B, has a local value of the extraction rate that varies monotonically along the axis (Oy). In particular, the local value of the extraction rate increases as an input edge of the corresponding planar waveguide is farther, at which light is injected. Stated differently, the local value of the extraction rate increases as the output face 113A, respectively 113B is closer. Each local value may be calculated on a single pattern of the considered diffraction grating, or it may be an average value relating to several neighbouring patterns, for example less than five neighbouring patterns. In each diffraction grating, the local value of the extraction rate varies, along the axis (Oy), according to a non-linear law.

The value of the extraction rate of a diffraction grating is a function of a value of its fill factor. In each pattern of the considered diffraction grating, the fill factor is equal to the surface area of the high index portion, divided by the total surface area of the corresponding pattern, where said surface areas are defined in a sectional plane parallel to the plane (Oxy). The fill factor can also be considered as a volume ratio (volume occupied by the low index portion, divided by the total volume of the corresponding pattern). In particular, these two definitions are exactly equivalent for a constant depth diffraction grating. Extraction is higher the closer the fill factor is to 50% (the highest index modulation). Advantageously, therefore, in each of the diffraction gratings 130A, 130B, a local value of the fill factor monotonically ranges from 0% to 50%, or from 100% to 50%, from one end of the diffraction grating to the other and as an input edge of the planar waveguide 120A, respectively 120B is farther. Advantageously, the fill factor does not exceed 0.5 (50%). In this case, the higher the fill factor, the higher the extraction rate, and vice versa. Thus, advantageously, in each of the diffraction gratings 130A, 130B, a local value of the fill factor increases as an input edge of the planar waveguide 120A, respectively 120B is farther. In other words, in each of the diffraction gratings 130A, 130B, a local value of the fill factor increases as the first output face 113A, respectively second output face 113B is closer. Again, each local value may be calculated on a single pattern of the diffraction grating, or it may be an average value relating to a number of neighbouring patterns, for example less than five neighbouring patterns.

Additionally or alternatively, the variation in the extraction rate may be obtained using diffraction gratings whose depth varies along the axis (Oz).

In each of the planar waveguides 120A, 120B, the diffraction grating 130A, 130B is configured to extract light from said planar waveguide, at the extraction wavelength (common to both diffraction gratings), and in a direction of extraction defined by an extraction angle $\theta A$, respectively $\theta B$.

The value of $\theta A$ is defined by the pattern distribution pitch in the first diffraction grating. The value of AA is adapted so that light extracted from the first planar waveguide can emerge from the first support substrate, at the first output face 113A, and taking account of the refraction at the interface between the first planar waveguide and the first support substrate. For this, this light has to impinge on the first output face 113A, with an angle of incidence strictly lower than a first critical angle of total internal reflection (angles defined relative to the normal to said output face 113A). The first critical angle of total internal reflection is determined by the Snell-Descartes laws, and depends on the refractive index of the first support substrate 110A and the refractive index of the medium in contact with the first output face 113, in use. This medium is typically air, so that the first critical angle of total internal reflection is approximately 17° with a silicon support substrate.

The same applies to the value of $\theta B$.

Figure 3:
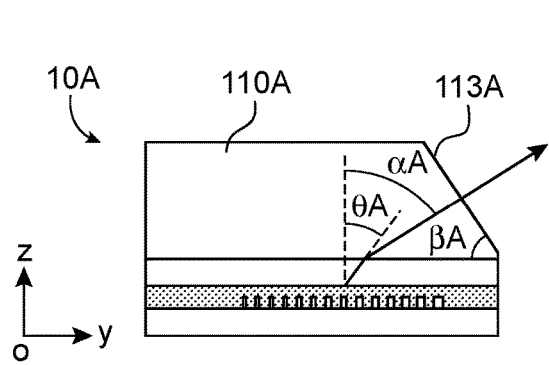
FIG. 3 schematically illustrates an advantageous arrangement of the directions of extraction and output faces in the optical component of FIGS. 1A and 1B.

FIG. 3 is a detail view of FIG. 1A, showing solely the object arm 10A. The first output face 113A is tilted by an angle $\beta A$ relative to the plane (Oxy). Here, the first support substrate 110A is made of crystalline silicon, and the angle $\beta A$ is equal to 54.74°, which corresponds to an anisotropic etch angle of a face-centred cubic type crystal (for example silicon) or a diamond type square-lattice crystal. The angle formed between the normal to the plane (Oxy) of the optical component and the light axis of propagation in the first support substrate, after refraction at the interface between the first planar waveguide and the first support substrate, is called αA. For simplicity, the object arm 10A is configured here so that this light impinges at normal incidence on the first output face 113A. For this, the value taken by the angle αA should be equal to the value taken by the angle βA, here equal to 54.74°. Alternatively, βA can be equal to 45° (plane 110 of a face-centred cubic crystal). The normal incidence on the first output face 113A ensures that light is not deflected when passing through the same.

In any case, preferably, the value of an angle formed between the plane of the optical component and the first output face 113A, is substantially equal to the value of the extraction angle by the first diffraction grating corrected for the angular offset brought by refraction at the interface between the first planar waveguide and the first support substrate, to within 5°, and even to within 1° (with the extraction angle defined relative to the normal to the plane of the optical component).

The same applies in the reference arm.

Figure 4:
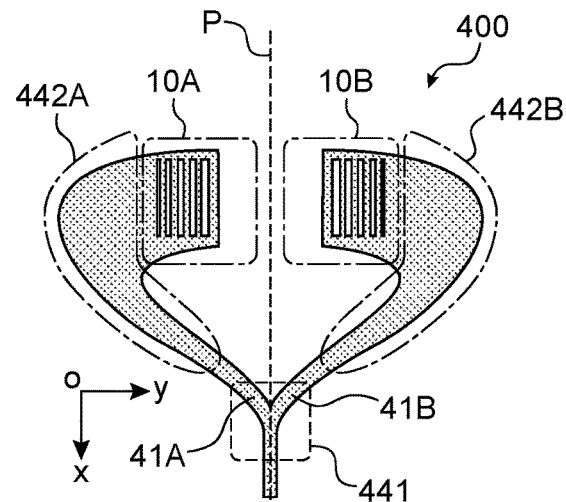
FIG. 4 schematically illustrates a second embodiment of an optical component.

FIG. 4 schematically illustrates, in a top view, an optical component 400 according to a second embodiment. The optical component 400 comprises the following elements:
- an object arm 10A and a reference arm 10B, as described above;
- a splitter 441 with one input and two outputs; and
- a first adaptation guide 442A and a second adaptation guide 442B.

The splitter 441 is configured to receive as an input an initial light beam, and to split it to the two outputs 41A, 41B. The distribution is advantageously 50/50, but other distributions are not excluded, especially to balance the optical power emerging from the object arm with the optical power emerging from the reference arm at best. The splitter 441 may comprise one of a Y-junction, or an MMI coupler, etc. The splitter 441 allows synchronised light beams of the same wavelength to be injected into each of the first and second planar waveguides.

The first adaptation guide 442A extends between the splitter output 41A and the object arm 10A. It performs adiabatic mode adaptation, by virtue of a width that increases gradually from its output 41A end to its object arm 10A end. It has a curvature, to rotate the light direction of propagation, here by 90° in a plane (Oxy). Said curvature is also adiabatic.

Similarly, the second adaptation guide 442B extends between the splitter output 41B and the reference arm 10B. It also has a width that increases gradually from its end at the output 41B to its end at the reference arm 10B.

The width here refers to a dimension parallel to the plane (Oxy), and orthogonal to the light direction of propagation in the first adaptation guide 442A, respectively in the second adaptation guide 442B.

The first and second adaptation guides 442A, 442B are each bent, so as to inject light into the object arm 10A, respectively into the reference arm 10B, along directions of injection with opposite senses. Here, these directions of injection are parallel to each other, and even one and the same.

The splitter 441 and the adaptation guides 442A, 442B are formed in a same stack of layers as the planar waveguides of the object arm and the reference arm. They consist of the material of the core layers of said planar waveguides, and surrounded by the material of the sheath layers.

Again, the optical component is substantially symmetrical, according to a planar symmetry relative to the plane P. Here, it is an exact symmetry.

Figure 5A:
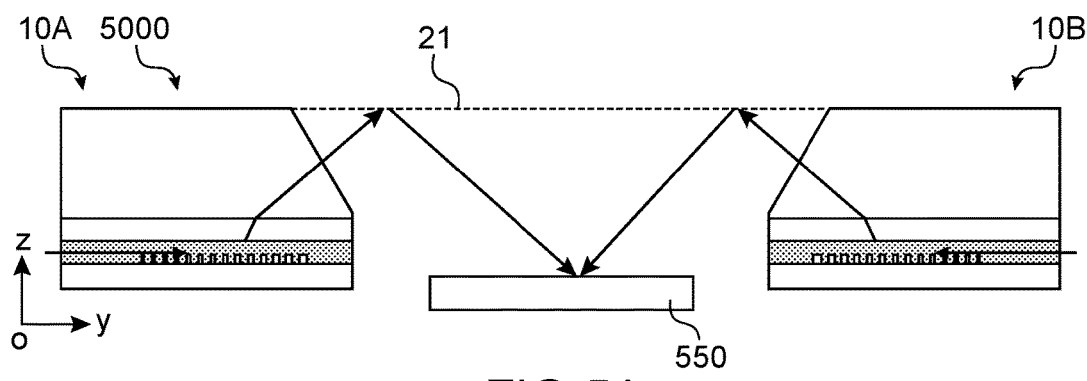
FIGS. 5A and 5B schematically illustrate, in two respective cross-section views, a first embodiment of a system.
Figure 5B:
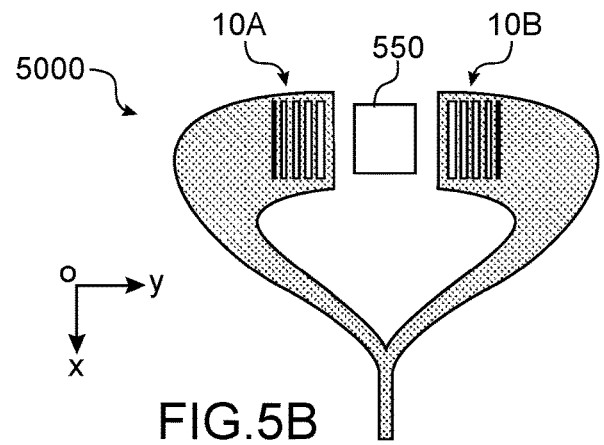

FIGS. 5A and 5B schematically illustrate, in two respective cross-section views, a system 5000.

The system 5000 here includes:
- an optical component as described with reference to FIG. 4, especially with an object arm 10A and a reference arm as illustrated in FIGS. 1A and 1B; and
- an array detector 550, sensitive at the wavelength of the object and reference beams, here sensitive in the infrared range.

The array detector 550 is preferably an infrared array detector, for example a bolometer array, or a photodiode array. Alternatively, the array detector may be sensitive in the visible range, for example consisting of a photodiode array. The array detector 550 extends parallel to the plane (Oxy), between the object arm 10A and the reference arm 10B, in the zone 203 identified in FIG. 2. A distance along (Oz) between the array detector 550 and the surface 21 is preferably between 100 µm and 1.5 µm. Advantageously, the array detector 550 extends at the same height along the axis (Oz) as the lower faces of the planar waveguides, on the side opposite to the support substrates. The optical component can then serve as a spacer between the sample to be analysed (and here the reference sample) and a detection module including the array detector 550. There is no image forming optics between the array detector 550 and the sample-receiving surface 21, in use.

Figure 6A:
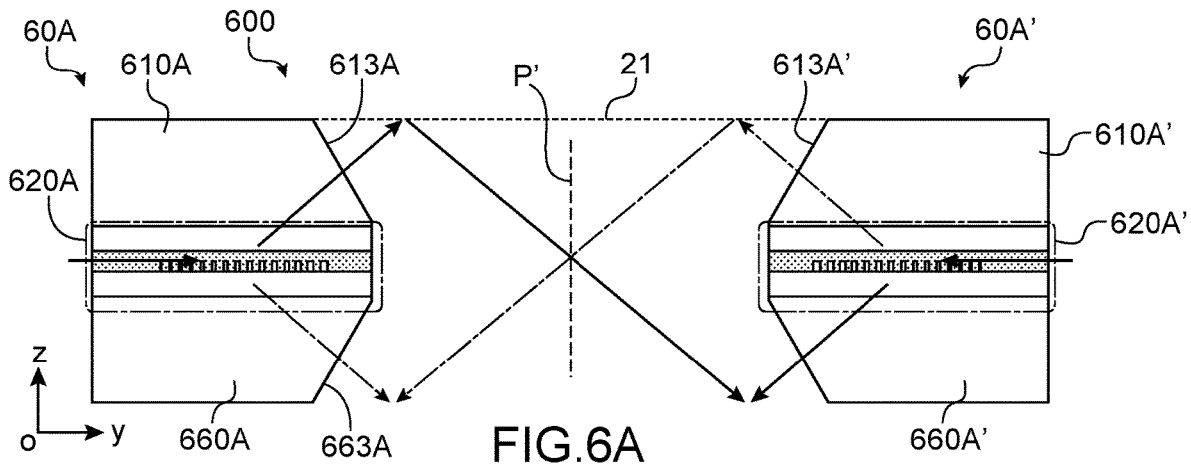
FIG. 6A schematically illustrates a third embodiment of an optical component.

FIG. 6A schematically illustrates a third embodiment of an optical component 600, which will be only described for its differences relative to the embodiment in FIGS. 1A and 1B.

In this embodiment, the object arm 60A further comprises a first lower substrate 660A, with the first planar waveguide 620A interposed between the first support substrate 610A and the first lower substrate 660A. Here, the first lower substrate 660A extends in direct physical contact with a low index layer of the stack in which the first planar waveguide is formed.

The first lower substrate 660A consists of a material transparent to the extraction wavelength of the first and second diffraction gratings. Here, the first lower substrate 660A consists of an infrared transparent material, preferably silicon. When the optical component is adapted for use with visible light, then the first lower substrate 660A consists of an optically transparent material in the visible range, for example diamond or a glass ($SiO_2$, BF33, quartz, etc) or an optical polymer, etc. The first lower substrate 660A is delimited especially by two plane faces parallel to the plane (Oxy), as well as by a transverse face 663A, obliquely oriented relative to the plane (Oxy) and connecting said plane faces.

In use, light is extracted by the first diffraction grating, from the first planar waveguide, in the direction of the first support substrate 610A and in the direction of the first lower substrate 660A, in two first directions of extraction that are symmetrical to each other relative to a plane parallel to the plane (Oxy). Light extracted in the direction of the first lower substrate 660A passes through the same, and emerges from it at its transverse face 663A. Light thus emerges from the object arm 60A in two substantially symmetrical directions relative to a plane (Oxy). It emerges from the object arm 60A from the first support substrate 610A, by being oriented towards the surface 21 as mentioned with reference to FIG. 1A, and from the first lower substrate 660A, by being oriented in a substantially symmetrical direction relative to a plane (Oxy).

The object arm 60A may have planar symmetry, relative to a plane of symmetry parallel to the plane (Oxy) and passing through the core layer of the first planar waveguide. The first support substrate preferably has the same thickness as the first lower substrate. Advantageously, but in a non-limiting way, the output face 613A of the first support substrate 610, and the transverse face 663A of the first lower substrate 660A, are tilted by the same angle in absolute value relative to the plane (Oxy).

Similarly, the reference arm 60A' further comprises a second lower substrate 660A', with the second planar waveguide 620A' interposed between the second support substrate 610A' and the second lower substrate 660A'. The second lower substrate 660A' consists of the same material as the first lower substrate 660A. The arms 60A and 60A' are similar. In use, light therefore emerges from the reference arm 60A', in two substantially symmetrical directions relative to a plane (Oxy). It emerges from the reference arm 60A' from the second support substrate 610A', by being oriented towards the surface 21 as mentioned with reference to FIG. 1A, and from the second lower substrate 660A', by being oriented in a substantially symmetrical direction relative to a plane (Oxy).

The reference arm 60A' and the object arm 60A are substantially symmetrical to each other relative to a plane of symmetry P' parallel to the plane (Oxz) and passing between the object arm 60A and the reference arm 60A'.

The optical component 600 is configured so that:
light emerging from the object arm 60A through the first support substrate 610A and reflected on the surface 21 interferes with light emerging from the reference arm 60A' through the second lower substrate 660A'; and
light emerging from the reference arm 60A' through the second support substrate 610A' and reflected on the surface 21 interferes with light emerging from the object arm 60A through the first lower substrate 660A.

Figure 6B:
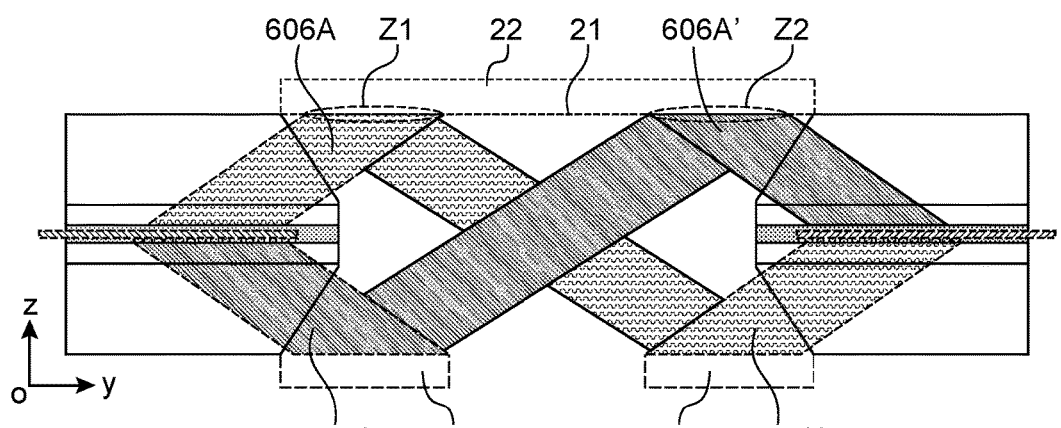
FIG. 6B schematically illustrates the optical component of FIG. 6A, in use.

FIG. 6B schematically illustrates the optical component 600, in use. In this embodiment, the sample to be analysed 22 extends over a larger extent, and there is no reference sample.

For simplicity, refraction at the interfaces between a planar waveguide and the corresponding support substrate, and at the interfaces between a planar waveguide and the corresponding lower substrate, has been ignored in FIGS. 6A and 6B.

In the following, the surface 21 is a virtual surface, simply used to define positioning of the sample to be analysed 22.

A light beam 606A, emerging from the object arm 60A in the direction of the surface 21, impinges on a first zone Z1 of the surface 21, over which a first region of the sample to be analysed 22 extends. The light beam 606A is reflected on the sample, after undergoing local phase shifts related to the local indices in the sample to be analysed 22. After reflection, the light beam 606A propagates to a zone 6031 for receiving a part of an array detector.

Similarly, a light beam 606A' emerges from the reference arm 60A' in the direction of the surface 21, impinges on a second zone Z2 of the surface 21, over which a second region of the sample to be analysed 22 extends, and is then reflected on the sample, after undergoing local phase shifts related to local indices in the sample to be analysed 22. After reflection, the light beam 606A' propagates to a zone 6032 for receiving a part of an array detector.

A light beam 607A' emerges from the reference arm 60A' in a direction symmetrical to the direction of the beam 606A' (relative to a plane parallel to the plane (Oxy)). This light beam 607A' impinges directly on the zone 6031 without passing through the sample to be analysed. In this zone 6031, it interferes with the light beam 606A returned by the sample to be analysed 22. The interference allows a first map of phase shifts to be obtained, relating to the zone Z1 of the sample to be analysed.

Similarly, a light beam 607A emerges from the object arm 60A in a direction symmetrical to the direction of the beam 606A (relative to a plane parallel to the plane (Oxy)). This light beam 607A impinges directly on the zone 6032 without passing through the sample to be analysed. In this zone 6032, it interferes with the light beam 606A' returned by the sample to be analysed 22. The interference allows a second map of phase shifts to be obtained, relating to the zone Z2 of the sample to be analysed.

The optical component 600 thus functions as two interferometric devices, each dedicated to a specific zone on the surface 21. It makes it possible to double the lit surface on the sample to be analysed, for a same lateral overall size of said optical component.

In this embodiment, the object arm 60A and the reference arm 60A' perform the same function. Each arm provides both a reference beam and an object beam, emitted downwardly and upwardly respectively, in two directions that are substantially symmetrical relative to a plane (Oxy). Throughout the text, the object arm may be referred to simply as "first arm" and the reference arm may be referred to simply as "second arm".

In a particular exemplary embodiment, the extraction wavelength of the first and second diffraction gratings is 7.25 µm. The sheath layers are made of 40% germanium SiGe alloy and the core layers are made of germanium. The core layers are each 2 µm thick (to make the guides single mode at 7.25 µm). The lit zone on the sample is a rectangle of 1.36*2.72 mm². The thickness of the supporting substrates and lower substrates is 680 µm. The grating pitch is 4.87 µm, which allows light to impinge at normal incidence on the 45° tilted output faces. The depth of the gratings here is 0.5 µm.

In this embodiment, it is advantageous that the first and second output faces 613A, 613A' of the support substrates are tilted by 45° relative to the plane (Oxy) of the planar waveguides. This angle corresponds to an etch angle of a face-centred cubic lattice crystal, and enables extent of a blind zone between zones Z1 and Z2 to be minimised. Another solution to minimise extent of the blind zone consists in altering the extraction angle of the diffraction gratings, but at the risk of losing normal incidence on the first and second output faces 613A, 613A'. For example, the output faces are kept tilted by 54.74° and the extraction angles and positions of diffraction gratings are chosen so as to minimise extent of the blind zone.

Preferably, the object arm and the reference arm are each configured so that extracted optical power on the support substrate side is greater than extracted optical power on the lower substrate side. This equalises optical powers of the interfering beams, in view of the power loss upon reflection on the sample. These balances can be obtained by adapting the choice of media in contact with the support substrates and lower substrates respectively, on their respective sides opposite to the planar waveguides. The optical component may therefore comprise a lower layer, under the first lower substrate and under the second lower substrate respectively, of adapted refractive index to achieve this balance of the optical powers.

In this embodiment, the coherence length of light injected into the optical component has to be greater than the optical path difference between a beam extracted from the support substrate side of one arm and a beam extracted from the lower substrate side of the other arm.

It is also proposed an optical system comprising the optical component 600, and an array detector that extends into both zones 6031 and 6032. Said array detector extends parallel to the plane (Oxy), here at the lower faces of the lower substrates 660A, 660A', on their sides opposite to the planar waveguides.

It is possible that the invention also covers alternatives in which the optical component further comprises a splitter and adaptation guides, as illustrated in FIG. 4. These alternatives are particularly advantageous, in that they allow synchronised light beams of the same wavelength to be injected into each of the first and second planar waveguides.

Figure 7:
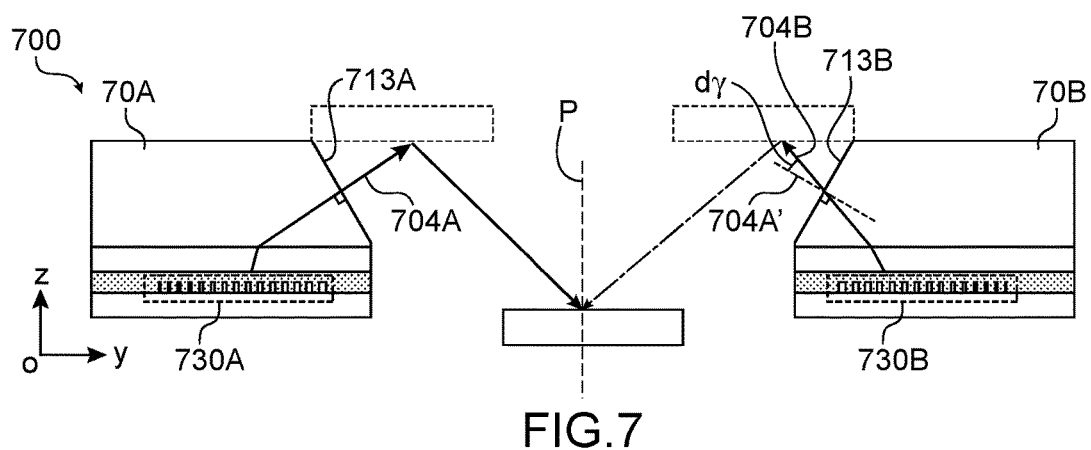
FIG. 7 schematically illustrates a fourth embodiment of an optical component.

FIG. 7 schematically illustrates a fourth embodiment of an optical component 700, which will be described only for its differences relative to the embodiment of FIGS. 1A and 1B. In the embodiment shown in FIG. 7, the optical component 700 is configured such that:
light emerges from the object arm 70A by being oriented along a first output axis 704A;
light emerges from the reference arm 70B by being oriented along a second output axis 704B; and
the object arm 70A and the reference arm 70B are almost symmetrical to each other relative to the plane P as mentioned above, with, however, a slight asymmetry such that the second output axis 704B, and the symmetric 704A' of the first output axis by virtue of the planar symmetry relative to the plane P, are tilted relative to each other by an angle dγ, with dγ greater than or equal to 0.1° or even 0.5°, and with dγ lower than or equal to 5° or even 1°.

Here, extracted light impinges at normal incidence on the output face of the object arm 70A, and impinges on the output face of the reference arm being tilted by an angle lower than 1° (in absolute value) relative to the normal to said output face of the reference arm.

The angular offset dγ can be obtained with:
a value of the pattern distribution pitch in the first diffraction grating distinct from the value of the pattern distribution pitch in the second diffraction grating; and/or
an angle formed between the plane (Oxy) and the first output face 713A distinct from an angle formed between the plane (Oxy) and the second output face 713B.

An interference pattern is thus obtained, with an inter-fringe that is a function of dγ.

A moiré phenomenon appears in case of undersampling of an interference pattern, and results in the detection of interference fringes, with an inter-fringe higher than the actual inter-fringe value. Fringes detected then have a Moiré inter-fringe, which is larger than the detector dimensions, thus preventing any measurement of the inter-fringe. Here, it is possible to select a value of dγ, allowing in fine, by virtue of the moiré phenomenon, interference fringes, whose inter-fringe is compatible with the dimensions of the detector, to be obtained on the array detector. It is thus possible to observe fringes, even with an array detector whose spatial sampling is not fine enough to resolve the theoretical interference fringes.

To ensure that the intersection surface of the interfering beams is not altered by the asymmetry, the first or second diffraction grating can be translated along the axis (Oy).

The invention also covers an optical component which differs from the embodiment of FIGS. 6A and 6B only in that there is a slight asymmetry between the output axes along which light emerges from the object arm and the output axes along which light emerges from the reference arm.

In both cases, the invention also covers alternatives with a splitter and adaptation guides, as illustrated in FIG. 4. These alternatives are particularly advantageous, in that they allow synchronised light beams of the same wavelength to be injected into each of the first and second planar waveguides. If necessary, a distribution factor of the splitter can be adapted to compensate for any difference in extraction efficiency between the two arms.

In any case:
the object arm is configured so that at least part of the light extracted by the first diffraction grating emerges from the object arm by being oriented along a first output axis;
the reference arm is configured so that at least part of the light extracted by the second diffraction grating emerges from the reference arm oriented along a second output axis; and
the object arm and the reference arm are substantially symmetrical to each other, according to a planar symmetry by a plane of symmetry orthogonal to the plane of the optical component, and with a possible asymmetry defined by an angular deviation lower than or equal to 5° (or even lower than or equal to 1°) between the second output axis and the symmetric of the first output axis by said planar symmetry.

The invention also covers an optical system, not shown, which includes:
an optical component, with a splitter and two adaptation guides as illustrated in FIG. 4; and
a coherent source, especially a laser source (for example a quantum cascade laser or an interband cascade laser), capable of providing an initial light beam as an input to the splitter.

Light injection into the optical component is performed from the rim. The coherent source is preferably an infrared light source.

The invention also covers an optical system, not shown, which includes:
an optical component;
a calculator, connected to the array detector, configured to receive as an input light intensity measurements provided by the detector, and to output an image of a sample to be analysed formed by a distribution map of phase shifts.

The calculator may be further configured to calculate, from the distribution map of phase shifts, a distribution map of local chemical or biological compositions in the sample, and to output said distribution map of local chemical or biological compositions.

The optical component can be made from an initial silicon substrate. Successive epitaxies are performed on this initial substrate, to form a stack of low index and high index layers, with anisotropic partial etching operations to form the diffraction gratings and delimit the planar waveguides (and if necessary the splitter and adaptation guides). The initial substrate is then etched to form the support substrates with their output faces. If necessary, a further substrate is deposited and etched, to form the lower substrates of an optical component as illustrated in FIGS. 6A and 6B. Said further substrate has two transverse faces obliquely oriented, forming the first and second output faces of the object arm and the output arm respectively. These transverse faces are formed prior to transfer to the stack, for example by anisotropic etching or by a moulding and stamping method. The resulting optical component is thus a silicon integrated component.

The invention is not limited to the examples described, and covers many other alternatives, especially with different materials, different extraction wavelengths, etc. The invention covers all combinations of extraction angle and inclination angle of the output faces to achieve the desired light path. In the examples described, patterns of the diffraction gratings extend along straight lines parallel to each other. Alternatively, these patterns may extend along convex curved lines. The curves need not be identical along the entire length of the diffraction grating. It may be advantageous to have patterns that do not have the same curvature frontwardly or rearwardly of the grating. According to other alternatives, the gratings may be two-dimensional diffraction gratings, allowing the sample to be analysed, to be lit under two different polarisations. According to still other alternatives, the first and second output faces are not planar, but curved, for example to diverge light emerging from the optical component. In this case, a tilt angle of an output face is defined by considering a plane connecting two edges delimiting said output face. According to still other alternatives, the optical component does not comprise support substrates. The latter are nevertheless advantageous, in order to control distance between the diffraction gratings and the sample to be analysed at best, by adjoining the latter against at least one of the support substrates.

The invention makes it possible to carry out interferometric imaging, for example in the infrared range. It allows chemical or biological analyses of a sample to be carried out, and wide-field images to be obtained rapidly with compact instrumentation. It especially has applications in the health and food industry field.

The invention claimed is:

1. An optical component for an interferometric imaging device, comprising:
    an object arm, comprising a first planar waveguide extending parallel to a plane called the plane of the optical component, and at least one first diffraction grating formed in the first planar waveguide and capable of extracting light from the first planar waveguide and from the object arm; and
    a reference arm, comprising a second planar waveguide extending parallel to the plane of the optical component, and at least one second diffraction grating formed in the second planar waveguide and capable of extracting light from the second planar waveguide and from the reference arm,
    wherein at least part of the light extracted from the object arm reflects off an optically reflective surface that extends parallel to the plane of the optical component and is positioned between the object arm and the reference arm and interferes with at least part of the light extracted from the reference arm that reflects off the optically reflective surface, and
    wherein the interference between the light from the object arm and light from the reference arm occurs at a position between the object arm and reference arm.

2. The optical component according to claim 1, wherein:
    the object arm is configured so that at least part of the light extracted by the first diffraction grating emerges from the object arm by being oriented along a first output axis;
    the reference arm is configured so that at least part of the light extracted by the second diffraction grating emerges from the reference arm by being oriented along a second output axis;
    wherein the second output axis is tilted by an angle lower than or equal to 5°, relative to the symmetric of the first output axis in a plane of symmetry orthogonal to the plane of the optical component.

3. The optical component according to claim 1, wherein:
    the object arm further comprises a first support substrate, superimposed on the first planar waveguide along an axis orthogonal to the plane of the optical component; and
    the reference arm further comprises a second support substrate, superimposed on the second planar waveguide along an axis orthogonal to the plane of the optical component;
    and wherein:
    the object arm is configured so that at least part of the light extracted by the first diffraction grating emerges from the object arm at a first output face, belonging to the first support substrate and oriented transversely relative to the plane of the optical component; and
    the reference arm is configured so that at least part of the light extracted by the second diffraction grating emerges from the reference arm at a second output face, belonging to the second support substrate and oriented transversely relative to the plane of the optical component.

4. The optical component according to claim 3, wherein:
    in the object arm, the first diffraction grating has a first value of the pattern distribution pitch, adapted to extract a light beam at an extraction wavelength, and along a first direction of extraction such that light penetrates the first support substrate and then emerges therefrom at the first output face;
    in the reference arm, the second diffraction grating has a second value of the pattern distribution pitch, adapted to extract a light beam at said extraction wavelength, and along a second direction of extraction such that light penetrates the second support substrate and then emerges therefrom at the second output face.

5. The optical component according to claim 4, wherein:
    in the object arm, the first direction of extraction is adapted so that an associated light beam impinges at normal incidence on the first output face; and
    in the reference arm, the second direction of extraction is adapted so that an associated light beam impinges at normal incidence on the second output face.

6. The optical component according to claim 3, wherein each of the first diffraction grating and the second diffraction grating:
    consists of patterns that each comprise a low index portion, of a low index material, and a high index portion, of a high index material, with the refractive index of the high index material strictly greater than the refractive index of the low index material; and
    has a local value of a fill factor which monotonically varies as the first output surface or second output surface respectively, is closer, the local value of the fill factor thus gradually approaching the value 0.5, and with the fill factor referring to a ratio of an area occupied by the low index portion in a pattern of said diffraction grating to a total area occupied by said pattern, said areas being defined in a section plane parallel to the plane of the optical component.

7. The optical component according to claim 3, wherein:
the object arm further comprises a first lower substrate, with the first planar waveguide interposed between the first support substrate and the first lower substrate;
the reference arm further comprises a second lower substrate, with the second planar waveguide interposed between the second support substrate and the second lower substrate;
wherein the object arm is configured such that light extracted by the first diffraction grating emerges from the object arm through the first support substrate and the first lower substrate; and
wherein the reference arm is configured so that light extracted by the second diffraction grating emerges from the reference arm through the second support substrate and the second lower substrate.

8. The optical component according to claim 1, further including a splitter with one input and two outputs, configured to receive as an input an initial light beam and to distribute the same towards the object arm and the reference arm, and further including:
a first adaptation guide, extending between the first output of the splitter and the first planar waveguide of the object arm, and having an increasing width from an end adjoining the first output of the splitter to an end adjoining the first planar waveguide; and
a second adaptation guide, extending between the second output of the splitter and the second planar waveguide of the reference arm, and having an increasing width from an end adjoining the second output of the splitter to an end adjoining the second planar waveguide.

9. The optical component according to claim 8, wherein the first adaptation guide and the second adaptation guide are each bent, such that a light axis of propagation at the input of the first planar waveguide and a light axis of propagation at the input of the second planar waveguide are parallel to each other and with opposite senses.

10. The optical component according to claim 1, having planar symmetry, relative to a plane of symmetry orthogonal to the plane of the optical component and passing between the object arm and the reference arm.

11. The optical component according to claim 1, wherein:
the object arm is configured so that at least part of the light extracted by the first diffraction grating emerges from the object arm by being oriented along a first output axis;
the reference arm is configured so that at least part of the light extracted by the second diffraction grating emerges from the reference arm by being oriented along a second output axis; and
the object arm and the reference arm are nearly symmetrical to each other, according to a planar symmetry by a plane of symmetry orthogonal to the plane of the optical component, and with an asymmetry defined by an angular deviation of between 0.5° and 5° between the second output axis and the symmetric of the first output axis by said planar symmetry.

12. An optical system comprising an optical component according to claim 1, and an array detector located between the object arm and the reference arm and configured to acquire an interference pattern formed by at least part of the light extracted from the object arm and at least part of the light extracted from the reference arm.

13. The optical system according to claim 12, wherein the array detector extends into an intersection region between a light beam extracted from the object arm and reflected on a first zone of the optically reflective surface, and a light beam extracted from the reference arm and reflected on a second zone of the optically reflective surface.

14. The optical system according to claim 12, wherein:
the object arm is configured to extract light along two distinct directions;
the reference arm is configured to extract light along two distinct directions; and
the array detector extends into a first intersection region and into a second intersection region;
wherein the first intersection region is a region in which a light beam extracted from the object arm and reflected on a first zone of the optically reflective surface interferes with a light beam extracted from the reference arm and directly impinging on said first intersection region; and
wherein the second intersection region is a region in which a light beam extracted from the reference arm and reflected on a second zone of the optically reflective surface interferes with a light beam extracted from the object arm and directly impinging on said second intersection region.

* * * * *